(12) United States Patent
Norton

(10) Patent No.: US 8,191,754 B2
(45) Date of Patent: Jun. 5, 2012

(54) MAGNETIC PLUG WELD TOOL

(75) Inventor: Donovan K. Norton, La Verne, CA (US)

(73) Assignee: Durston Mfg. Co., La Verne, CA (US)

( * ) Notice: Subject to any disclaimer, the term of this patent is extended or adjusted under 35 U.S.C. 154(b) by 439 days.

(21) Appl. No.: 12/561,473

(22) Filed: Sep. 17, 2009

(65) Prior Publication Data

US 2010/0001041 A1 Jan. 7, 2010

Related U.S. Application Data

(63) Continuation-in-part of application No. 11/956,135, filed on Dec. 13, 2007, now Pat. No. 7,631,797.

(60) Provisional application No. 60/874,539, filed on Dec. 13, 2006.

(51) Int. Cl.
*B23K 9/035* (2006.01)

(52) U.S. Cl. ............... 228/50; 228/216; 219/160

(58) Field of Classification Search ............ 228/50, 228/226, 216; 219/160; 26/8
See application file for complete search history.

(56) References Cited

U.S. PATENT DOCUMENTS

| | | | |
|---|---|---|---|
| 1,648,683 A | 11/1927 | Herald | |
| 2,584,072 A | 1/1952 | White | |
| 2,866,889 A | 12/1958 | Dempsey | |
| 3,135,047 A | 6/1964 | Houser | |
| 3,437,251 A | 4/1969 | Wilkes | |
| 3,548,489 A | 12/1970 | Arikawa | |
| 3,570,109 A | 3/1971 | Harlan | |
| 3,593,982 A * | 7/1971 | Price | 29/559 |
| 4,190,998 A | 3/1980 | Keith | |
| 4,205,219 A | 5/1980 | Snell | |
| 4,295,593 A | 10/1981 | Kensrue | |
| 5,451,741 A | 9/1995 | Doronin et al. | |
| 7,410,087 B1 | 8/2008 | Owensby | |

FOREIGN PATENT DOCUMENTS

JP 72002011 1/1972

OTHER PUBLICATIONS

Eastwood Co., 4 and 8 Inch Magnetic Copper Butt-Weld Backer Set., I<http://www.eastwoodco.com/shopping/productIdetailmain.jsp-?'ProductID-21231 >. Dec. 13, 2007.
Eastwood Co., 4 and 8 Inch Magnetic Copper ButtOWeld Backer Set. "Customer Reviews"; Dec. 13, 2007.
Definition Thumb screw: http://en.wikipedia.org/wiki/Thumb-screw_(fastener).
Third posting of Plug welding small holes—Here's a tip! on http://www.hotrodders.com posted Feb. 6, 2006.
Eastowood Co., Plugweld Pliers., <http://www.eastwoodco.com/shopping/productidetailmain.jsp?iProductID=10856>; Dec. 13, 2007.

* cited by examiner

*Primary Examiner* — Jessica L Ward
*Assistant Examiner* — Kevin E Yoon

(57) ABSTRACT

A magnetic plug weld tool includes an arm, a copper alloy plate that is rotatably connected to one end of the arm, and a magnetic base that is connected to the arm. The arm is configured to apply a force to the copper alloy plate using the magnetic base.

19 Claims, 6 Drawing Sheets

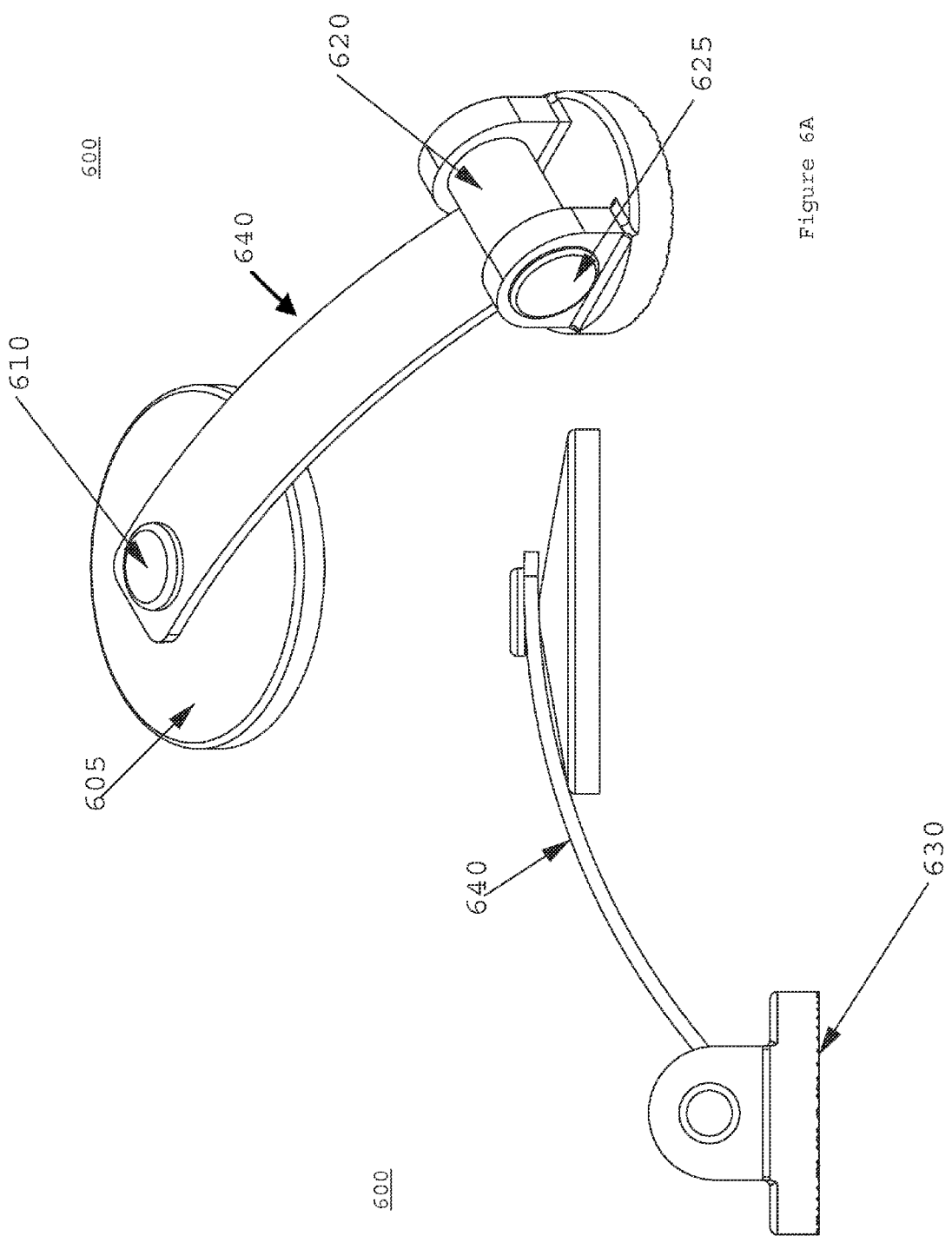

MAGNETIC PLUG WELD TOOL

CROSS-REFERENCE TO RELATED APPLICATIONS

This application is a continuation-in-part of U.S. Non-Provisional Application Ser. No. 11/956,135, filed Dec. 13, 2007 now U.S. Pat. No. 7,631,797, entitled "MAGNETIC PLUG WELD TOOL," which claims the benefit of U.S. Provisional Application No. 60/874,539, filed Dec. 13, 2006, all of which are incorporated by reference herein in its entirety.

FIELD OF INVENTION

The embodiments relate to welding tools, and in particular to an adjustable magnetic welding tool.

BACKGROUND

The art of welding is used for many purposes, but often to fill holes that have been left in surfaces, for example screw holes or rivet holes left in sheet metal, such as on the side of a car or truck body.

When welding closed a hole in light gauge sheet metal with a wire feed welder, such as a MIG welder, the welding operator must start the weld at one side of the hole, and move around the perimeter of the hole, working towards the center.

This sort of welding often poses a problem, as the wire feed weld wire will often go through the hole, causing the welding operator to have to cut off the lead of the wire and start again with a fresh lead.

A further problem arises when the heat from the welding machine melts the sheet metal around the hole, making the hole larger, not smaller. Even if the hole is not made larger, the heat often distorts the sheet metal body panels, creating more problems to be fixed.

Another problem arises because the back surface of what is being welded accumulates a mound of metal from the weld built-up on the front and backside of the sheet metal panel. The excess welded material on the front side can usually be ground off, but the welded material that remains on the inside of a sheet metal body panel often is inaccessible to a grinder. This is especially true of the extra mirror holes that tend to accumulate on the sides of old truck doors.

While, a welding operator could try to have an assistant hold something on the other side of the hole being welded closed, this is not usually practical, as it doubles the labor cost, and often, such an extra person simply is not usually available.

Magnets have long been used to hold backup devices in place for welding, but most required bulky magnets with screw assemblies, e.g., U.S. Pat. No. 2,584,072 to White, and U.S. Pat. No. 2,866,889 to Dempsey. These old magnetic devices did not have a means for spacing the backup device away from the magnet to protect the magnet from the heat.

There are commercially available "plugweld pliers" that support the weld area, use copper alloy pads to absorb excess heat, and cover the back of the hole, as the weld is being applied. One such example of these plugweld pliers is sold by Eastwood Co. on its website at www.eastwoodco.com under the Auto Body; Body & Fender; Body Tools & Accessories section. Unfortunately, these types of plugweld pliers only work on areas that are within two inches of the edge of a sheet of metal, and on which the back end of the hole is readily accessible and exposed, to affix the plugweld pliers.

Also available from Eastwood Co. on its website at www.eastwoodco.com under the Auto Body; Body & Fender; Body Tools & Accessories section is a product known as a magnetic copper butt-weld backer set. These copper alloy plates have magnets to hold them to the back of a hole, which is good because the welding material does not stick to the copper alloy plate. Unfortunately, as noted in the Customer Reviews on the Eastwood Co. website, the magnets do not have enough holding power, and they lose their power due to repeated heating.

In order to address these and other issues, there remains a long felt need in the art for a magnetic plug weld tool that has sufficient magnetic power to hold onto metal, even in tight spaces, with spacing between the copper alloy plate, and that does not require that the hole to be plugged is within two inches of the edge of the sheet metal. The inventor has solved all of these problems with a tool that works and has experienced significant commercial success in the many months that it has been available for purchase by the welding public.

SUMMARY OF THE INVENTION

Various embodiments of the invention are directed towards overcoming the above shortcomings by disclosing an invention that uses a magnetic base holding a magnet to hold the copper alloy plate surface against the backside of the hole to be welded. This backer makes the hole easier to weld, and leaves a flat surface on the backside of the sheet metal.

In various embodiments of the invention, the copper alloy plate makes a smooth surface to which the hot molten weld material does not adhere.

The tool will work on all sheet metal and steel to facilitate welding closed holes and voids. The tool can be used anytime that the welder can get access to the backside of the hole or void, but the hole need not be within two inches of an edge, and the hole may be in metal, like the door of a car or truck, where the backside is relatively difficult to access, and not readily available for the welder to hold something on the backside of the hole.

Using the tool of this invention, a welder can start the weld in the center of the hole, using a circular motion to fill the hole, which is a much quicker, and often more esthetically pleasing method of filling than with any of the prior art devices or methods.

In addition, because the holes can be welded closed much quicker, the metal panels do not get subjected to as much heat; therefore they do not get distorted as much as with other tools or methods of welding the holes closed.

The tool of this invention prevents the wire on a wire feed welder from feeding through the hole to be filled, and thus saves material. More importantly, the tool of this invention saves time, because the welder does not need to stop welding as frequently, to cut off the long overfeed of wire, thus saving more time, and enabling more items to be welded in a shorter period of time.

The copper alloy plate acts as a heat sink, taking and dissipating quicker the excess heat that builds up on the backside of the hole being welded. This further helps to reduce damage and distortion to the metal sheet being welded.

The pivot arm may be of any of a variety of lengths, widths, and configurations, but serves primarily to separate the copper alloy plate from the magnet, so the heat of the welding does not damage the power of the magnet.

The copper alloy plate may be of any of a number of shapes, sizes, and configurations, and may be attached to the pivot arm in a number of ways, including by a cotter pin, a rivet, or any of a number of other means known to those of skill in the art.

The copper alloy plate may have its ends bent up, to facilitate easy attachment, as in the preferred embodiment, but it need not employ that configuration to be within the scope of the invention as disclosed and claimed here.

The contact portion of the copper alloy plate may be of any of a variety of surface types, including serrated, smooth, ridged, or any of a number of other means known to those of skill in the art.

The copper alloy plate may be made of any of a number of alloys of copper.

In order to overcome the problem associated with lining up the backup right at the backside of the hole being welded, and holding the copper alloy plate flush with the inner surface of the metal sheet, a thumb screw is used to pivot the arm holding the copper alloy plate, so it lies flush with the back surface. This will work, even if the portion of sheet metal where the hole is being welded closed is not generally flat. Thumb screws in multiple lengths, widths, shapes, sizes, and with varying kinds of knobs on top are readily available, for example, from Shear-Loc® Products, at their website, www-.shear-loc.com.

Various embodiments of the invention can have various shapes and configurations of knobs on the thumb screws.

Various embodiments of the invention further feature a non marring pad at the bottom of the thumb screw, to go directly against the inside surface of the sheet metal or steel being welded, for use with a magnet that is connected to the center section of the pivot arm.

The pivot arm itself operates much like a human arm, where the copper alloy plate is the palm of the hand, the first pin, or rivet, acts like the wrist, and the second pin, or rivet, acts like the elbow. This configuration permits the tool to be manipulated at many different angles, to accommodate surfaces with various angles, radii of curvature, or rough patches.

The base with magnet housing portion of the tool can be affixed to any ferrous surface, and the pivot arm may be adjusted to bring the copper alloy plate in contact with the back of the hole to be welded closed.

One aspect provides a magnetic plug weld tool including an arm, a copper alloy plate that is rotatably connected to one end of the arm, and a magnetic base that is connected to the arm. The arm is configured to apply a force to the copper alloy plate using the magnetic base.

Another aspect provides a magnetic plug weld tool including a magnetic base, a flexible arm coupled to the magnetic base, and a copper alloy plate that is rotatably connected to one end of the flexible arm. The flexible arm is configured to apply a force to the copper alloy plate via torque.

Still another aspect provides a magnetic plug weld tool including a circular magnetic base, an arm connected to a middle portion of the magnetic base, a copper alloy plate that is connected to an end portion of the arm, and a torque generation device coupled to another end portion of the arm. The arm rotates via a means for rotating coupled to the magnetic base and the torque generation device creates a force that is applied to the copper alloy plate to maintain contact with a surface.

It further remains within the contemplation of the invention for this magnetic plug weld tool to be used in other varying combinations, and ways, as may be known in the art.

BRIEF DESCRIPTION OF THE DRAWINGS

The embodiments are illustrated by way of example, and not by way of limitation, in the Figures of the accompanying drawings and in which like reference numerals refer to similar elements and in which:

FIG. 6A-B are perspective views of another alternative embodiment of a magnetic plug weld tool.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope the invention.

The description may disclose several preferred embodiments of magnetic plug weld tools, as well as methods and/or component parts thereof. While the following description will be described in terms of magnetic plug weld tools for clarity and to place the invention in context, it should be kept in mind that the teachings herein may have broad application to all types of systems, devices and applications.

One embodiment of the invention provides a magnetic plug weld tool including an arm, a copper alloy plate that is rotatably connected to one end of the arm, and a magnetic base that is connected to the arm. The arm is configured to apply a force to the copper alloy plate using the magnetic base.

Figure 1:
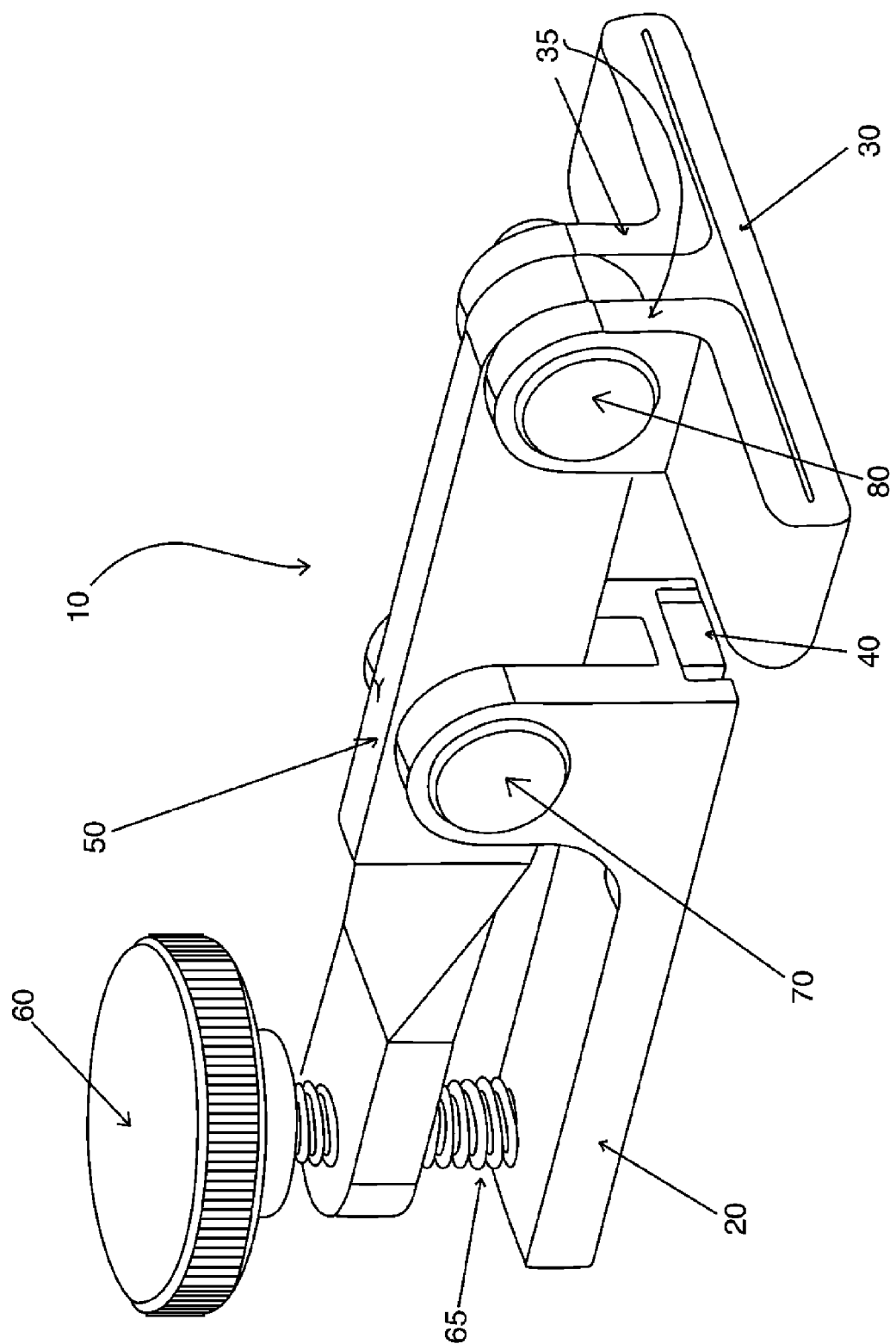
FIG. 1 is a perspective view of the magnetic plug weld tool.

FIG. 1 is an illustration in perspective view of the magnetic plug weld tool 10. The magnetic plug weld tool 10 has a base with magnet housing 20, a magnet 40, a copper alloy plate 30 in one of a variety of shapes and sizes, with its copper wings bent up 35. The copper alloy plate 30 with copper wings bent up 35 is rotatably connected to the proximal end of a pivot arm 50 by a pin 80. The base with magnet housing 20 is rotatably connected to the mid-section of the pivot arm 50 by a pin 70. The distal end of pivot arm 50 has a hole through which is inserted a thumb screw 65 topped with a knob 60 that is configured to be turned by hand. In one embodiment of the invention the copper alloy plate 30 is replaceable with other sized and/or shaped copper alloy plates to accommodate various applications. In one embodiment of the invention, a ratchet type socket (not shown) is employed for quick disconnect and connect of the various sized and shaped copper alloy plates to the pivot arm 50.

Figure 2:
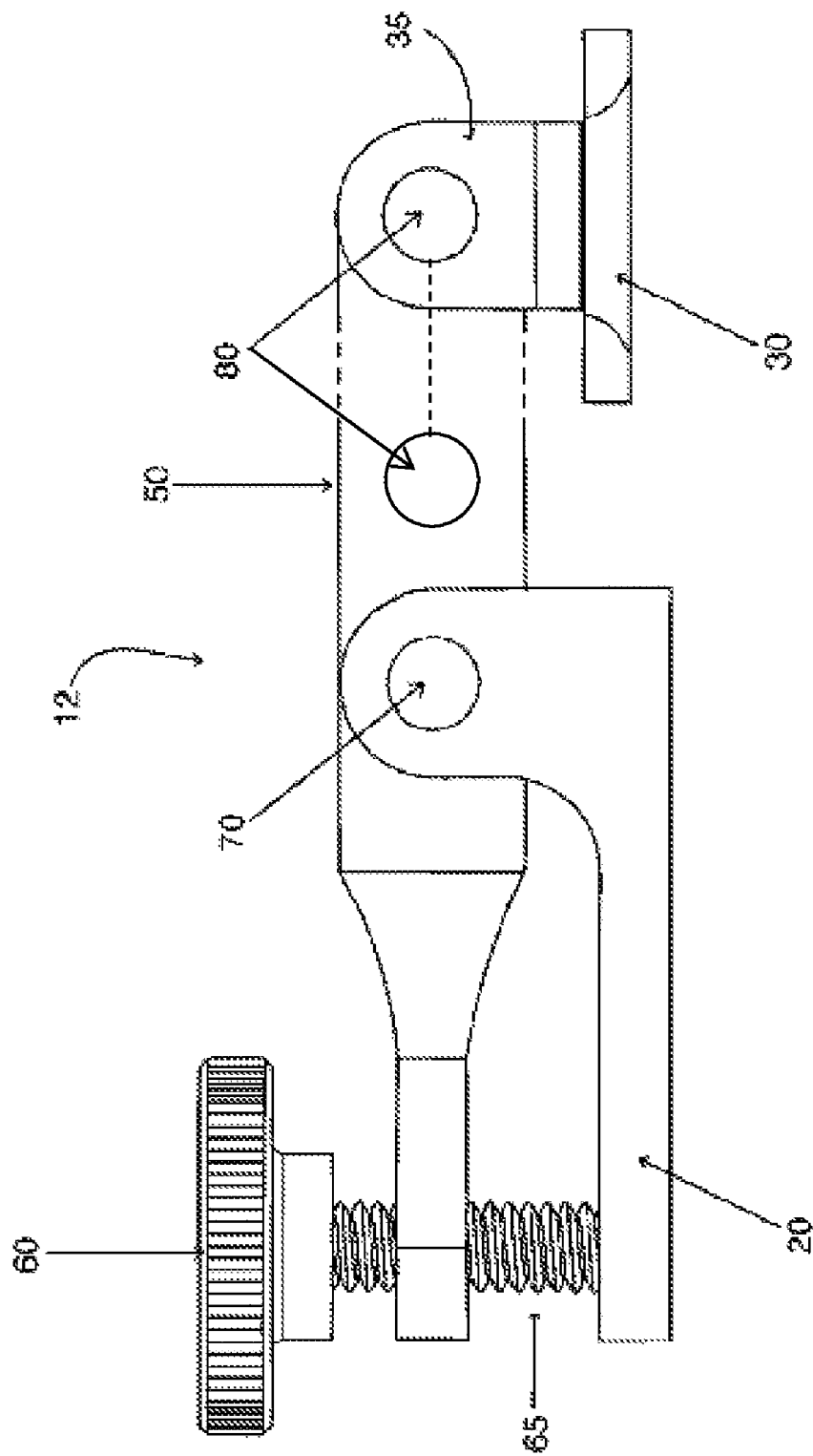
FIG. 2 is a side view of the magnetic plug weld tool.

FIG. 2 is a side view of the magnetic plug weld tool 12. The magnetic plug weld tool 12 has a base with magnet housing 20, a copper alloy plate 30 with copper wings bent up 35. The copper alloy plate 30 with copper wings bent up 35 is rotatably connected to the proximal end of a pivot arm 50 by a pin 80. The base with magnet housing 20 is rotatably connected to the mid-section of the pivot arm 50 by a pin 70. The distal end of pivot arm 50 has a hole through which is inserted a thumb screw 65 topped with a knob 60. It should be noted that the length of the pivot arm 50 may vary depending on the type of application. In one embodiment of the invention the pivot arm 50 includes an extension arm (not shown) that can be employed to extend the length of the pivot arm 50. In one embodiment of the invention the extension arm may be configured as a sleeve or an additional arm portion that is connected to the end of the extension arm and attached through pin 80 or a bolt, screw, locking mechanism, etc. In these embodiments of the invention the pivot arm 50 may be replaced with a telescoping arm (not shown).

In one embodiment of the invention the thumb screw 65 is surrounded by a coil spring (not shown). In another embodiment of the invention the thumb screw 65 is replaced by an equivalent means, such as a spring and a clamp mechanism, or other known displacement means that can adjust the end of the pivot arm 50 up or down in relation to the magnet housing 20.

Figure 3:
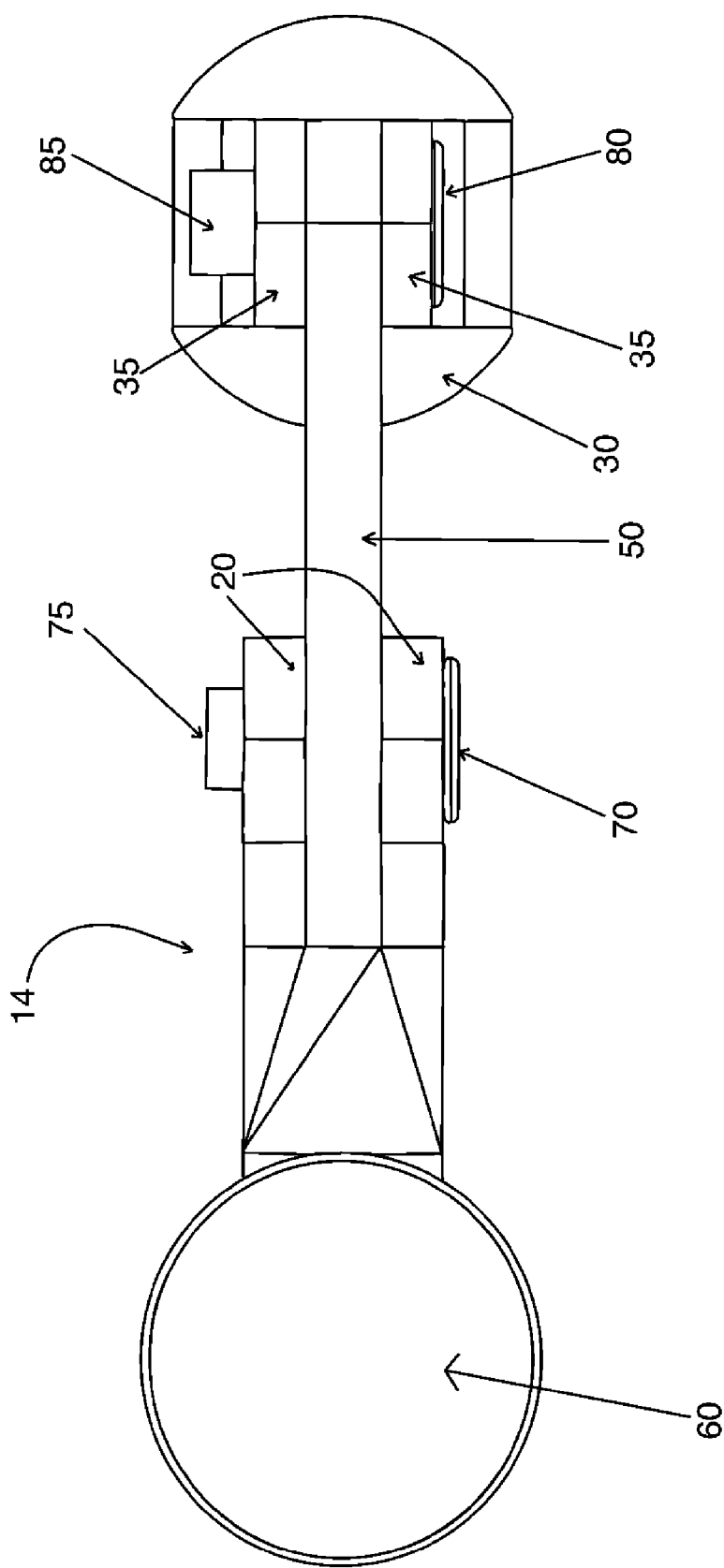
FIG. 3 is a top plan view of the magnetic plug weld tool.

FIG. 3 is a top plan view of the magnetic plug weld tool 14. The magnetic plug weld tool 14 has a base with magnet housing 20, a copper alloy plate 30 with copper wings bent up 35. The copper alloy plate 30 with copper wings bent up 35 is rotatably connected to the proximal end of a pivot arm 50 by a pin 80 that has an end 85 that may be removably attached. The base with magnet housing 20 is rotatably connected to the mid-section of the pivot arm 50 by a pin 70 that has an end 75 that may be removably attached. The distal end of pivot arm 50 has a hole through which is inserted a thumb screw that is topped with a knob 60.

In one embodiment of the invention the pivot arm 50 is attached to the magnetic housing by other known equivalent means. In these embodiments of the invention other means for rotating the pivot arm 50 can be used instead of holes through the pivot arm 50 and the pin 70. In another embodiment of the invention, the pivot arm 50 has multiple through holes (not shown) for connecting the pivot arm to the magnetic base 20 to adjust the distance from the magnetic base to the copper alloy plate 30. In these embodiments of the invention, the there are also multiple through holes in the distal end of the pivot arm that the thumb screw 65 may be deployed due to the adjustment of the pivot arm 50 in relation to the magnetic base 20.

Figure 4:
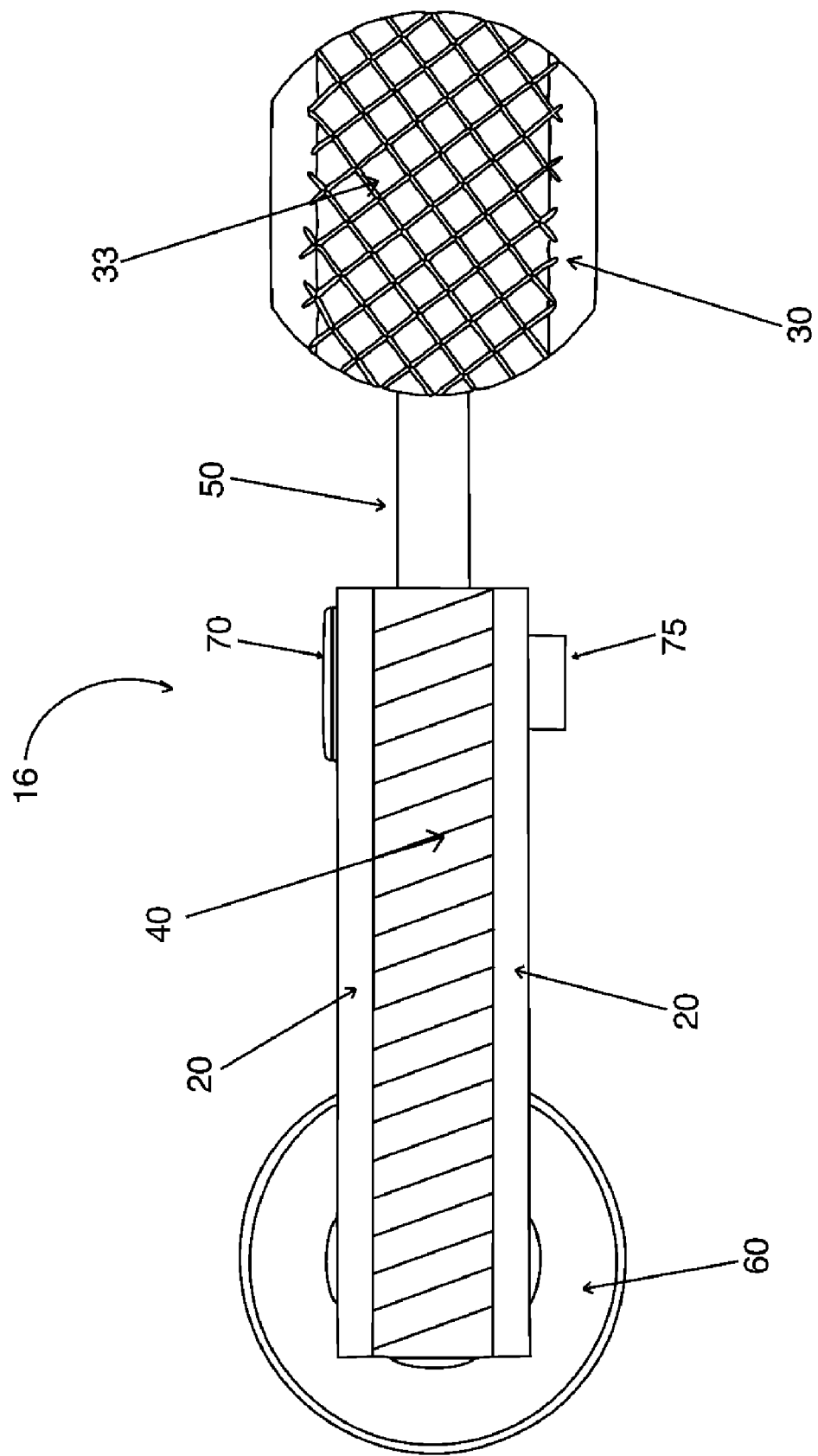
FIG. 4 is a bottom plan view of the magnetic plug weld tool.

FIG. 4 is a bottom plan view of the magnetic plug weld tool 16. The magnetic plug weld tool 16 has a base with magnet housing 20, a magnet 40, and a copper alloy plate 30 with a serrated surface 33 that contacts the welding material. The copper alloy plate 30 with a serrated surface 33 that contacts the welding material is rotatably connected to the proximal end of a pivot arm 50. The base with magnet housing 20 containing magnet 40 is rotatably connected to the mid-section of the pivot arm 50 by a pin 70 that has an end 75 that may be removably attached. The distal end of pivot arm 50 has a hole through which is inserted a thumb screw that is topped with a knob 60.

Figure 5:
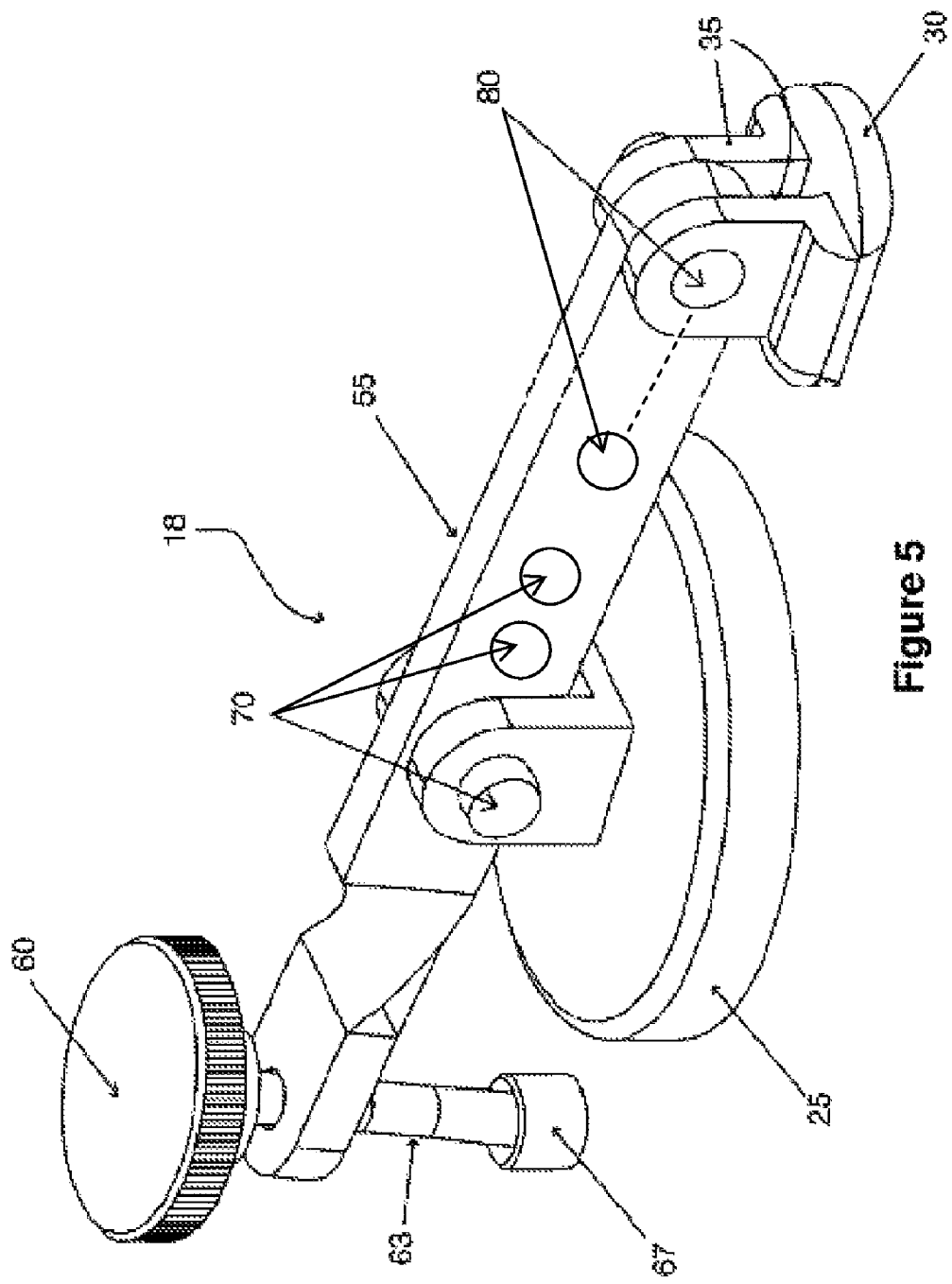
FIG. 5 is a perspective view of an alternative embodiment of a magnetic plug weld tool.

FIG. 5 is a perspective view of an alternative embodiment of a magnetic plug weld tool 18. The alternative embodiment of a magnetic plug weld tool 18 has a circular base with magnet housing 25, a copper alloy plate 30 in one of a variety of shapes and sizes, with its copper wings bent up 35. The copper alloy plate 30 with copper wings bent up 35 is rotatably connected to the proximal end of a longer pivot arm 55 by a pin 80. The circular base with magnet housing 25 is rotatably connected to the mid-section of the longer pivot arm 55 by a pin 70. The distal end of the longer pivot arm 55 has a hole through which is inserted a longer thumb screw 63 topped with a knob 60 and having on the opposite end of the thumb screw 63 from the knob 60 a non marring pad 67. The thumb screw 63 is turnable by hand to apply or generate a torque force about the magnet housing to the copper alloy plate 30. In other embodiments of the invention the thumb screw 63 is replaced with equivalent devices to create/generate a force/torque on the copper alloy plate 30, such as a spring, etc.

In one embodiment of the invention the magnet housing 25 may be replaced with different size and shape magnetic housings. In one embodiment of the invention the magnetic housing 25 is attached to the pivot arm 55 with a means for clamping the magnetic housing 25 to the pivot arm 55. In one embodiment of the invention the pivot arm has a groove (not shown) that the means for connecting the magnetic base 25 to the pivot arm 55 may slidably connect the magnetic base 25 to the pivot arm 55. In another embodiment of the invention the pivot arm includes multiple indentations for snap fitting the slidably connected magnetic base 25 to the pivot arm 55.

In other embodiments of the invention, different magnetic bases 25 may be employed and attached to the pivot arm 55 depending on the application. For example, multiple magnetic bases that are spread apart (not shown) are connected through a central housing that is attached to the pivot arm 55. The multiple magnetic bases 25 may be set up as pairs, multiple pairs, groups of three triangularly spaced apart, etc. These alternative adaptations allow the magnetic plug weld tool 18 to be used in applications where metal portions of an attachment surface are spread apart. In another embodiment of the invention, the magnetic base 25 employs multiple magnetic bases that are slidably connected to a central housing for adjusting to an attachment surface.

FIG. 6A illustrates another embodiment of the invention including a magnetic plug weld tool 600. In one embodiment of the invention the magnetic plug weld tool 600 includes a magnetic base 605 shown in a circular shape. It should be noted that the magnetic base 605 may be provided in any shape and size. In one embodiment of the invention, the magnetic base 605 is a standard magnet, a housing including a magnet, a magnetized housing, etc. In other embodiments of the invention, the magnetic base may include rare earth magnets (e.g., neodymium-iron-boron (NIB) magnets, samarium-cobalt magnets, etc.) for additional magnetic strength and size adjustment.

As further illustrated in FIG. 6A, in one embodiment of the invention the magnetic base 605 is connected to the arm 640 with means for attaching 610. In one embodiment of the invention, the means for attaching 610 can be a rivet, a screw, a bolt, a pin, a ratchet socket means, a female housing for inserting a screw or bolt from the magnetic base 605, etc. In one embodiment of the invention the magnetic base 605 is rotatably connected to the arm 640. In other embodiments of the invention the magnetic base 605 is fixedly attached to the arm 640. In yet another embodiment of the invention the magnetic base 605 is attached to a swivel end so that the magnetic base 605 may swivel to accommodate different surface shapes, angles, etc.

In one embodiment of the invention the proximate end of the arm 640 is connected to a rotatable base 620 that is connected to a copper alloy plate 630. In this embodiment of the invention the magnetic base 605 may be adjusted based on the rotation angle of the rotatable base 620. In one embodiment of the invention the arm 640 is curved and flexible to add a spring like force or torque to apply a force to the alloy plate 630 when the magnetic base 605 is deployed on a surface with the copper alloy plate 630. In this embodiment of the invention because the arm 640 is curved down from the magnetic base 605 to the copper alloy plate 630, when the magnetic base 605 is attached to a surface, a force is applied to attempt to force the copper alloy plate 630 upward. When the copper alloy plate 630 is placed on the surface the force maintains the copper alloy plate 630 on the surface from the spring like force or torque of the arm 640.

In another embodiment of the invention the arm 640 is coupled to a spring tension device (not shown) housed in the rotatable base 620 that applies a force to the arm 640 to force the copper alloy plate 630 down towards a surface to be welded.

In one embodiment of the invention the copper alloy plate 630 includes a serrated surface. In another embodiment of the invention the rotatable base 620 is connected to a swivel base so that the arm 640 and magnetic base 605 may be moved or adjusted during use. In some embodiments of the invention a pin 625 is used to connect the copper alloy plate 630 to the rotatable base 620. In other embodiments of the invention the pin 625 may be a means for attaching or rotating, such as an axle type device, ball bearing type device, a rotating sleeve, a rotation device, a pin, etc.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description. All the described embodiments and elements included in the various embodiments may be combined, configured, swapped, etc. with any and all of the other embodiments and elements included in the various embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A magnetic plug weld tool, comprising:
   an arm;
   a copper alloy plate that is rotatably coupled to one end of the arm; and
   a magnetic base that is coupled to another end of the arm, wherein the arm applies a force to the copper alloy plate using the magnetic base based on torque of the arm, wherein the arm is curved down from the magnetic base to the copper alloy plate along its entire length.

2. The magnetic plug weld tool of claim 1, wherein the magnetic base and the copper alloy plate each has a circular shape.

3. The magnetic plug weld tool of claim 1, wherein the copper alloy plate is rotatably coupled to the arm via means for attaching.

4. The magnetic plug weld tool of claim 3, wherein the magnetic base is rotatably coupled to the arm.

5. The magnetic plug weld tool of claim 3, wherein the arm is flexible, applies a force to the copper alloy plate, and maintains contact of the copper alloy plate with a surface.

6. The magnetic plug weld tool of claim 3, wherein a hand turnable screw adjusts a position of said copper alloy plate in relation to said magnetic base for flushly contacting a bottom surface to an inner surface of a metal sheet.

7. The magnetic plug weld tool of claim 6, wherein the hand turnable screw includes a non-marring surface that contacts the inner surface.

8. The magnetic plug weld tool of claim 2, wherein the arm rotates via a first pin coupled to the arm and the copper alloy plate rotates via a second pin coupled to the arm.

9. The magnetic plug weld tool of claim 2, wherein the copper alloy plate rotates via a pin coupled to the arm.

10. A magnetic plug weld tool, comprising:
    a magnetic base;
    a curved flexible arm coupled to the magnetic base; and
    a copper alloy plate that is rotatably connected to one end of the flexible arm;
    wherein the arm is curved down from the magnetic base to the copper alloy plate along its entire length, and
    wherein the flexible arm applies a force to the copper alloy plate via torque.

11. The magnetic plug weld tool of claim 10, wherein the magnetic base has a circular shape.

12. The magnetic plug weld tool of claim 10, wherein the copper alloy plate is rotatably coupled to the arm via means for attaching.

13. The magnetic plug weld tool of claim 12, wherein the arm is flexible, applies a force to the copper alloy plate, and maintains contact of the copper alloy plate with a surface.

14. A magnetic plug weld tool, comprising:
    a circular magnetic base;
    an arm rotatably connected to a middle portion of the magnetic base via a first pin;
    a copper alloy plate that is rotatably connected to an end portion of the arm via a second pin; and
    a torque generation device coupled to another end portion of the arm, wherein the arm rotates via the first pin and the torque generation device creates a force that is applied to the copper alloy plate for maintaining contact with a surface, and wherein the arm is curved down from the magnetic base to the copper alloy plate along its entire length.

15. The magnetic plug weld tool of claim 14, wherein the torque generation device adjusts a position of the copper alloy plate in relation to the magnetic base for flushly contacting a bottom surface of the copper alloy plate to an inner surface of a metal sheet.

16. The magnetic plug weld tool of claim 14, wherein a bottom surface of the copper alloy plate is replaceable.

17. The magnetic plug weld tool of claim 14, wherein length of the arm is extendable.

18. The magnetic plug weld tool of claim 14, wherein position of the magnetic base is adjustable along the arm.

19. The magnetic plug weld tool of claim 14, wherein the copper alloy plate is coupled to the arm via a rotational device.

* * * * *